United States Patent [19]

May

[11] Patent Number: 4,650,857

[45] Date of Patent: Mar. 17, 1987

[54] BLAND PROTEIN CONCENTRATES FROM PEANUTS AND PROCESS FOR MAKING

[75] Inventor: William A. May, Hackettstown, N.J.

[73] Assignee: Morse Capital Corporation, Uppersaddle River, N.J.

[21] Appl. No.: 810,862

[22] Filed: Dec. 18, 1985

[51] Int. Cl.$^4$ .................................................. A23J 1/14
[52] U.S. Cl. .................................... 530/377; 426/430; 426/457; 426/464; 426/632; 426/656
[58] Field of Search ................. 530/377; 426/656, 430, 426/457, 464, 632

[56] References Cited

U.S. PATENT DOCUMENTS

| | | | |
|---|---|---|---|
| 2,405,830 | 8/1946 | Irving et al. | 530/377 |
| 2,463,740 | 3/1949 | Burnett | 530/377 X |
| 2,529,477 | 11/1950 | Arthur, Jr. | 530/377 |
| 2,684,960 | 7/1954 | Taylor | 530/377 |
| 3,451,828 | 6/1969 | Baer et al. | 530/377 X |
| 3,579,496 | 5/1971 | Martinez et al. | 530/377 |
| 3,689,287 | 9/1972 | Mitchell | 426/457 |
| 3,800,056 | 3/1974 | Mitchell | 426/457 |
| 3,809,767 | 5/1974 | Sair et al. | 530/377 X |
| 3,947,599 | 3/1976 | Mitchell | 426/250 |
| 4,008,210 | 2/1977 | Steele et al. | 530/377 |
| 4,052,516 | 10/1977 | Mitchell | 426/457 X |
| 4,355,051 | 10/1982 | Pominski et al. | 426/632 |
| 4,424,408 | 7/1947 | McGeoch | 530/377 X |

OTHER PUBLICATIONS

"Chemical Engineers' Handbook", Fifth Edition, Perry and Chilton, McGraw-Hill Book Company, Copyright 1973 at pp. 17-3 through 17-8, 19-41 through 19-43 and 19-101 through 19-104.

Primary Examiner—Howard E. Schain
Attorney, Agent, or Firm—Hill, Van Santen, Steadman & Simpson

[57] ABSTRACT

A process is provided for preparing bland protein concentrates from peanuts by grinding, pressing, and extracting substantially at temperatures below about 100° F. The product protein concentrate is storage stable and displays high protein water solubility.

10 Claims, No Drawings

BLAND PROTEIN CONCENTRATES FROM PEANUTS AND PROCESS FOR MAKING

BACKGROUND OF THE INVENTION

1. Field of the Invention

This invention lies in the field of peanut protein concentrates and methods for making the same.

2. Prior Art

Various efforts have previously been made in the field of this invention to prepare high protein concentrates from peanuts.

So far as is now known, substantially all of the prior art peanut protein concentrates are characterized by having a relatively high developed color (being colored from tan to dark brown typically), by being relatively strongly peanut flavored, and by being relatively water insoluble.

In the prior art peanut protein concentrate preparation procedures, various heat treating steps are characteristically involved particularly either before or after an extraction step. This heat exposure is believed to effectuate taste development, color changes, protein denaturization, and perhaps other changes.

For example, Mitchell U.S. Pat. Nos. 3,689,287; 3,800,056; 3,947,599; and 4,052,516 teach processes involving the conversion of peanuts into precooked flakes. Typically, ground peanuts are slurried in water, heated with water, and then drum dried to produce flakes. The flakes can then be extracted, although problems exist in trying to extract the Mitchell flakes because of their tendency to break up into powdery materials which are difficult to separate and to extract. Characteristically, Mitchell employs relatively long heat exposure times which coagulate and denature the protein of the peanut and which cause color development and taste development in the final product.

For another example, Pominski et al in U.S. Pat. No. 4,355,051 describe a direct extraction process for producing a protein concentrate from peanuts. The starting peanuts are heated, blanched, re-moisturized, flaked, solvent extracted, filtered, de-solventized, and ground into flour. The flaking procedure of Pominski et al like the flaking procedure of Mitchell involves heat exposure.

So far as is known, no one has heretofore prepared a particulate bland storage stable peanut protein concentrate with high water solubility characteristics. During preparation of such concentrate, temperatures not above about 100° F. are characteristically involved.

BRIEF SUMMARY OF THE INVENTION

More particularly, the present invention is directed to a particulate, bland, storage stable protein concentrate derived from peanuts which comprises on a 100 weight percent total concentrate basis:

(A) from about 60 to 66 weight percent protein,
(B) from about 23 to 28 weight percent carbohydrate,
(C) from about 3 to 4 weight percent dietary fiber,
(D) from about 0.8 to 3 weight percent fat,
(E) from about 0.75 to 1.5 weight percent natural vitamins and minerals, and
(F) from about 0.5 to 3 percent water (moisture).

Such concentrate is further characterized by being in the form of solid particles at least 90 weight percent of which pass through a 50 mesh USDA standard sieve. Also, such concentrate is characterized by having a solubility in water such that at least about 60 weight percent (on a 100 weight percent total starting weight basis) of the total protein present therein is soluble in distilled water at ambient temperatures (and preferably at least about 80 weight percent).

Such a concentrate is made by the steps of:

(a) grinding while maintaining a temperature below about 100° F. shelled, skinned peanuts to produce particles having an average size ranging from about 0.25 to 0.50 inch (about 6.3 to 13 millimeters),
(b) pressing the resulting so ground material while maintaining a temperature below about 100° F. at a pressure sufficient to express from about 10 to 22 weight percent of the starting weight of said so ground material as peanut oil, and
(c) subjecting the resulting so pressed material to extraction with liquid hexane until not more than about 1 percent by weight of the total resulting extracted residue is comprised of peanut oil.

Various optional steps and conditions are hereinbelow described.

The invention is also directed to processes for producing such concentrates.

A principal object of the present invention is to provide a particulate storage stable peanut protein concentrate which is substantially free from fat (peanut oil).

Another principal object of the present invention is to provide, in a particulate storage stable peanut protein concentrate of the type indicated, a bland product which is substantially tasteless as prepared.

Another principal object is to provide, in a peanut protein concentrate of the type indicated, a product having substantial solubility in water. A product having high solubility in water is believed to be desirable not only from the standpoint of utilization of the concentrate in the preparation (including cooking) of foodstuffs incorporating such protein concentrate, but also from the standpoint of indicating that the protein material present in such concentrate is in a highly natural state and has not been appreciably denatured or otherwise altered in the preparation of the concentrate.

Another object of this invention is to provide a particulate peanut protein concentrate which is very light, and preferably substantially white, in color.

Another object of the present invention is to provide process technology which will permit production in a simple direct and reliable manner of a protein concentrate derived from peanuts having product characteristics as generally above indicated, particularly as regards water solubility characteristics.

Other and further objects, aims, purposes, features, advantages, embodiments, and the like will be apparent to those skilled in the art from the teachings of the present specification taken together with the claims.

DETAILED DESCRIPTION

The peanuts employed as starting material in the practice of the present invention are shelled and preferably skinned initially. If desired, the peanuts can be pre-dried to a specified moisture content, such as a moisture content below about 4.0 weight percent (based upon total starting shelled and skinned peanut weight). Also, if desired, the hearts can be removed. While it is preferred that the starting peanuts have substantially no exposure to temperatures over about 100° F. in order to minimize structural changes therein, such as protein denaturization, it is possible to heat the starting peanuts at a temperature of from about 200° to 250° C. for a time sufficient to eliminate what is generally characterized as the raw peanut taste. Typical times for such a preliminary heating step commonly range from about 0.5 to 2.0 minutes.

If desired, the starting peanuts may be blanched. Suitable blanching conditions comprise raising the temperature to at least 200° F. of the substrate with moist heat to inact enzyme activity.

Any convenient grinding procedure can be employed. Coarse grinding procedures are preferred. Preferably, the average particle size of the ground peanuts ranges from about 0.25 to 6.3 0.5 inches (about 1.0 to 13 millimeters). Smaller and larger particle sizes can be employed, if desired, without departing from the spirit and scope of the present invention. However, it is presently preferred to avoid particle sizes below about 0.1 inch (about 2.5 mm) because particles smaller than this minimum size can be difficult to retain upon the supporting screens utilized during extraction. Particle sizes greater than about 0.8 inch (about 20 mm) be troublesome to extract as desired herein. Grinding is preferably carried out at a temperature below about 100° F. and preferably below about 90° F.

The resulting so ground peanuts are next subjected to pressing. Preferably, the pressures employed during pressing are sufficient to express oil from the ground peanuts to an extent at least sufficient to reduce the starting weight of the ground peanuts by at least about 20 percent and preferably by at least about 23 weight percent. As those skilled in the art will appreciate, considerably less oil can be removed by pressing, but then more oil must be removed during the next or subsequent extraction step. Conventional pressing equipment can be employed. Typical pressing pressures range from about 25 to 200 pounds per square inch. Pressing is preferably carried out at temperatures below about 100° F. and more preferably at temperatures below about 90° F.

Pressing can be accomplished by conventional extractor machines of the type designed for the expression of oil from seeds, such as cotton seed, flax seed, and the like, as well as for extracting the juice from fruits. An extraction machine has typically a tapering screw rotating in a cylindrical barrel. Oil removed is delivered to a container while the residual solids mass is extruded separately. Machines of this type are sometimes also called expellers or expressing equipment. Suitable expressing equipment is shown and described, for example, in "Chemical Engineers' Handbook", Fifth Edition, Perry and Chilton, McGraw-Hill Book Company, Copyright 1973 at pages 19-101 through 19-104.

Optionally but preferably after the pressing the resulting press cake is broken up by agitation or the like so as to increase the surface area characteristics of the individual particles comprising such. Any convenient means for press cake break up can be employed as those skilled in the art will appreciate.

The resulting pressed material is then subject to extraction with an organic liquid which is a solvent for peanut oil and which has a boiling point below about 125° F. While, as those skilled in the art appreciate, various extraction liquids can be employed, such as, for examples, heptane, isopropyl alcohol, methylene dichloride, acetone, furfural, xylene, and liquid sulfur dioxide, and others, at the present time, hexane is the most preferred material for extraction because of the fact that substantially all of the hexane can be removed following extraction with virtually no residuals remaining.

Solvent extraction typically in the practice of the present invention involves a mixture composed of the peanut fragments and a liquid. Oil is particularly removed from the solids (extracted) by exposing the mixture of solid and liquid to the action of the solvent. Extraction can be performed by percolation of the solvent through the solids.

The removal of a soluble fraction, such as peanut oil, in the form of a solution, from an insoluble, permeable solid phase (such as the crushed or ground peanuts), is sometimes termed leaching. The separation usually involves selective dissolution with or without diffusion. The peanut oil is incorporated within, adsorbed upon, or held mechanically in the pore structure of the insoluble material constituting the peanut fragments. The leaching equipment employed in the practice of the process of the present invention may be divided into two principle classes: (1) that in which the leaching is accomplished by percolation, and (2) that in which particulate solids are dispersed into a liquid and subsequently separated from it. Each includes batch and continuous units. A few designs of continuous machines fall in neither of these major classes. Suitable leaching equipment is described on pages 19-41 through 19-43 of "Perry's Handbook" (reference above cited).

As those skilled in the art appreciate, two steps are always involved in solid-liquid extraction: (1) contact of solid and solvent to effect transfer of solute to solvent and (2) separation of resulting solution from the residual solid. Various operating methods employed in leaching are disclosed on pages 17-3 through 17.8 of the same above cited "Perry's Handbook".

A present preference is to conduct the leaching operation using a counter current flow of solute to solids at ambient temperatures.

Extraction (leaching) is continued until not more than about 1 percent by weight (based upon the total resulting extracted residue weight) is comprised of peanut oil (sometimes herein referred to as fat).

The extraction liquid containing dissolved therein the peanut oil is conventionally processed by distillation (evaporation) to separate the peanut oil (non-volatile) from the extraction liquid (which is volatile). The volatilized extraction liquid is conventionally condensed and thereafter is reused for further extraction in the process technology of the present invention. Conventional separation and recovery procedures are involved. Such do not constitute part of the present invention.

After extraction is completed, the extracted material is preferably dried after removal from the extractor. Drying can be conventionally accomplished, but preferably the extracted residue is not heated to a temperature above about 100° F. during drying.

The extracted residue may be employed as such as a food additive or it can be subjected to further size reduction so as to produce a flour or meal therefrom. In general, the extracted residue is in the form of particles which are easily crushed and broken up. Conveniently, the size reduction or light grinding operation is carried out under conditions such that the final particulate material is in a size such that at least about 90 weight percent thereof passes through a 50 mesh USDA standard sieve.

The product (that is, the resulting extracted residue) has a composition as above indicated in the "Brief Summary" section.

The extracted residues of the present invention constitute a particulate protein concentrate which is bland, typically virtually colorless (white or an off white), and such concentrates are storage stable for an indefinite period of time.

It is theorized (and there is no intent herein to be bound by theory) that the storage stability characteristics of the present invention result because of the circumstance that the particulate protein concentrate products of the present invention are substantially completely defatted. Thus, although small amounts of enzymes appear to be retained in the product concentrate, such are not in a position to induce any chemical action in the associated solids owing to the absence of oil. Because of the processing temperatures (that is, substantially ambient temperatures) employed in the practice of the present invention, very little change in the protein structure of the starting peanut occurs. Thus, very little denaturing of the protein fraction results during processing. As a consequence, the protein concentrate products of the present invention have their associated excellent solubility characteristics and bland (essentially flavorless) taste characteristics.

A present particularly preferred class of particulate bland storage stable protein concentrates of the present invention comprises on a 100 weight percent total concentrate basis:
(A) from about 60 to 66 weight percent protein,
(B) from about 23 to 28 weight percent carbohydrate,
(C) from about 3 to 4 weight percent dietary fiber,
(D) from about 0.8 to 3 weight percent fat,
(E) from about 0.75 to 1.5 weight percent natural vitamins and minerals, and
(F) from about 0.5 to 3 percent water (moisture).

EMBODIMENTS

As is apparent from the foregoing specification, the invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

EXAMPLE 1

Raw peanuts are shelled and skinned and then subjected to grinding to produce particles ranging in size from about 0.25 to 0.4 inch in average maximum size.

These particles are pressed at ambient temperature in a screw press and about 20 weight percent of the starting weight of said particles is removed and separated as peanut oil.

Thereafter the press cake resulting is broken up and subjected to counter current extraction with liquid hexane until the solid residue contains not more than about 1 percent by weight based on total residue weight of peanut oil.

The resulting residue is then dried at 100° F. until substantially all of the hexane is removed and then the residue is ground at ambient temperatures to produce a powder at least 90 weight percent which has a particle size sufficient to pass through a 50 mesh USDA standard sieve.

The powder is bland, substantially white in color, storage stable, and substantially free from raw peanut taste. About 85 weight present of the protein percent in this product powder is soluble in water. The composition of this product is believed to be within the ranges of the particularly preferred class of concentrates above described.

EXAMPLE 2

The procedure of Example 1 is repeated except that the starting peanuts after skinning are blanched at 150°-160° C. for 2-3 minutes before grinding.

The powdered extracted and dried product appears to have slightly less peanut taste and about the same protein solubility.

I claim:
1. A process for preparing a peanut protein concentrate comprising the steps of:
    (a) grinding while maintaining a temperature below about 100° F. shelled, skinned peanuts to produce particles having an average size ranging from about 0.25 to 0.50 inch,
    (b) pressing the resulting so ground material while maintaining a temperature below about 100° F. at a pressure sufficient to express from about 48 to 23 weight percent of the starting weight of said so ground material as peanut oil and,
    (c) subjecting the resulting so pressed material to extraction with liquid hexane until not more than about 1 percent by weight of the total resulting extracted residue is comprised of peanut oil.
2. The process of claim 1 wherein said resulting extracted residue is dried at a temperature below about 100° F. to separate residual hexane therefrom.
3. The process of claim 1 wherein said resulting extracted residue is subjected to sufficient grinding action to reduce the particle size thereof to such an extent that at least about 90 weight percent thereof passes through a 50 mesh USDA standard sieve.
4. The process of claim 1 wherein prior to said grinding, said peanuts are exposed to temperatures ranging from about 200° to 250° F. for a time sufficient to eliminate the raw peanut taste.
5. The process of claim 1 wherein prior to said grinding said peanuts are blanched.
6. A particulate, bland, storage stable protein concentrate comprising on a 100 weight percent total concentrate basis:
    (A) from about 60 to 66 weight percent protein,
    (B) from about 23 to 28 weight percent carbohydrate,
    (C) from about 3 to 4 weight percent dietary fiber,
    (D) from about 0.8 to 3 weight percent fat,
    (E) from about 0.75 to 1.5 weight percent natural vitamins and minerals, and
    (F) from about 0.5 to 3 percent water,
said concentrate being further characterized by:
    (1) being in the form of particles at least about 90 weight percent of which pass through a 50 mesh USDA standard sieve, and
    (2) having a solubility in water such that at least about 80 weight percent of a 30 gram sample of said concentrate is soluble in a liter of distilled water,
said concentrate having been made by the steps of:
    (a) grinding while maintaining a temperature below about 100° F. shelled, skinned peanuts to produce particles having an average size ranging from about 0.25 to 0.50 inch,
    (b) pressing the resulting so ground material while maintaining a temperature below about 100° F. at a pressure sufficient to express from about 18 to 23 weight percent of the starting weight of said so ground material as peanut oil, and (c) subjecting the resulting so pressed material to extraction with liquid hexane until not more than about 1 percent by weight of the total resulting extracted residue is comprised of peanut oil.

7. The concentrate of claim 6 wherein said resulting extracted residue is heated at a temperature below about 100° F. to remove residual hexane therefrom.

8. The concentrate of claim 6 wherein the resulting so dried residue is ground to reduce the particle size thereof to an extent such that at least about 90 weight percent thereof passes through a 50 mesh USDA standard sieve.

9. The concentrate of claim 6 wherein before said grinding said peanuts are heated to a temperature ranging from about 200° to 250° F. for a time sufficient to eliminate the raw peanut taste.

10. The concentrate of claim 6 wherein prior to said grinding said peanuts are blanched.

* * * * *